(12) United States Patent
Naito et al.

(10) Patent No.: US 11,279,229 B2
(45) Date of Patent: Mar. 22, 2022

(54) FRICTION ENGAGEMENT DEVICE FOR WORK VEHICLE AND WORK VEHICLE

(71) Applicant: KOMATSU LTD., Tokyo (JP)

(72) Inventors: Shinichi Naito, Tokyo (JP); Daiki Tanaka, Tokyo (JP); Kyousuke Moriguchi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 171 days.

(21) Appl. No.: 16/642,632

(22) PCT Filed: Feb. 27, 2019

(86) PCT No.: PCT/JP2019/007559
§ 371 (c)(1),
(2) Date: Feb. 27, 2020

(87) PCT Pub. No.: WO2019/187928
PCT Pub. Date: Oct. 3, 2019

(65) Prior Publication Data
US 2020/0346543 A1 Nov. 5, 2020

(30) Foreign Application Priority Data

Mar. 28, 2018 (JP) .............................. JP2018-062236

(51) Int. Cl.
*B60K 17/06* (2006.01)
*F16D 13/69* (2006.01)
(Continued)

(52) U.S. Cl.
CPC .............. *B60K 17/06* (2013.01); *F16D 13/69* (2013.01); *F16D 25/0638* (2013.01)

(58) Field of Classification Search
CPC ..... B60K 17/06; F16D 13/69; F16D 25/0638; F16H 25/12
See application file for complete search history.

(56) References Cited

U.S. PATENT DOCUMENTS 4,442,929 A * 4/1984 Uchida ................... F16D 25/14
                                                                188/366
6,035,989 A * 3/2000 Matsuoka ........... F16D 25/0638
                                                                192/106 F
(Continued)

FOREIGN PATENT DOCUMENTS

CN 1702346 A 11/2005
CN 1945042 A 4/2007
(Continued)

OTHER PUBLICATIONS

The Office Action for the corresponding Chinese application No. 201980003968.0, dated Nov. 18, 2020.
(Continued)

*Primary Examiner* — Tinh Dang
(74) *Attorney, Agent, or Firm* — Global IP Counselors, LLP

(57) ABSTRACT

A friction engagement device includes a rotating shaft, first friction plates that rotate with the rotating shaft, second friction plates arranged to face the first friction plates, an oil chamber supplied with hydraulic fluid, a piston movably provided between engagement and release positions, and first and second return springs. The piston is pressed toward the engagement position by hydraulic pressure of the oil chamber. The first return spring contacts the piston from the engagement position to a standby position between the release position and the engagement position and urges the piston toward the release position. The second return spring contacts the piston from the engagement position to the release position and urges the piston toward the release position. Center axes of the first and second return springs are arranged to coincide with a center axis of the rotating shaft.

10 Claims, 5 Drawing Sheets

(51) Int. Cl.
*F16D 25/0638* (2006.01)
*F16D 25/12* (2006.01)

(56) References Cited

U.S. PATENT DOCUMENTS

| | | | |
|---|---|---|---|
| 6,543,596 | B2 | 4/2003 | Martin et al. |
| 9,151,333 | B2 * | 10/2015 | Hemphill ............ F16D 25/0638 |
| 9,249,843 | B2 * | 2/2016 | Ari .......................... F16D 48/02 |
| 9,709,102 | B2 * | 7/2017 | Samie ................. F16H 63/3026 |
| 2002/0020601 | A1 | 2/2002 | Martin et al. |
| 2005/0217964 | A1 | 10/2005 | Asahina et al. |
| 2005/0263367 | A1 | 12/2005 | Kita et al. |
| 2007/0080041 | A1 | 4/2007 | Goto et al. |
| 2007/0175725 | A1 | 8/2007 | Sawayanagi |
| 2009/0229905 | A1 | 9/2009 | Kato et al. |
| 2013/0075222 | A1 | 3/2013 | Ari |
| 2014/0060993 | A1 | 3/2014 | Tseng et al. |
| 2014/0174878 | A1 | 6/2014 | Hemphill et al. |
| 2016/0363177 | A1 | 12/2016 | Samie et al. |
| 2017/0314624 | A1 | 11/2017 | Raisch |

FOREIGN PATENT DOCUMENTS

| | | |
|---|---|---|
| CN | 107269743 A | 10/2017 |
| DE | 3838865 A1 | 6/1989 |
| DE | 19833376 A1 | 12/1999 |
| DE | 10 2015 225 033 A1 | 6/2017 |
| EP | 2 143 967 A1 | 1/2010 |
| JP | 48-90046 U | 10/1973 |
| JP | 4-307122 A | 10/1992 |
| JP | 5-288227 A | 11/1993 |
| JP | 7-113465 A | 5/1995 |
| JP | 2005-344792 A | 12/2005 |
| JP | 2009-220593 A | 10/2009 |
| JP | 2016-8627 A | 1/2016 |
| KR | 10-2017-0110963 A | 10/2017 |

OTHER PUBLICATIONS

The International Search Report for the corresponding international application No. PCT/JP2019/007559, dated Jun. 4, 2019.
The extended European search report for the corresponding European application No. 19777354.2, dated Apr. 1, 2021.

* cited by examiner

FRICTION ENGAGEMENT DEVICE FOR WORK VEHICLE AND WORK VEHICLE

CROSS-REFERENCE TO RELATED APPLICATIONS

This application is a U.S. National stage application of International Application No. PCT/JP2019/007559, filed on Feb. 27, 2019. This U.S. National stage application claims priority under 35 U.S.C. 119(a) to Japanese Patent Application No. 2018-062236, filed in Japan on Mar. 28, 2018, the entire contents of which are hereby incorporated herein by reference.

BACKGROUND

Field of the Invention

The present invention relates to a friction engagement device for a work vehicle and a work vehicle.

Background Information

A friction engagement device includes a piston, a plurality of first friction plates, and a plurality of second friction plates. The first friction plates are connected to the rotating member. The second friction plates are connected to a member that restricts the rotation direction. In the friction engagement device, the first friction plates and the second friction plates are engaged each other by pressing a piston toward an engagement position by hydraulic pressure. Further, the piston is urged toward a release position by a return spring. When the hydraulic pressure is reduced, the piston is pushed back to the release position by urging force of the return spring. Thereby, the first friction plates and the second friction plates are released.

In order to ensure release of the friction plates or to cool the friction plates heated by frictional heat, a disengaging margin (gap) is provided between the friction plates. Therefore, when the number of friction plates is large, there is a problem that the time required for engagement is long. A similar problem also occurs when the volume of the piston is large.

In order to solve the above-mentioned problem, it is conceivable to realize a state in which the engagement is not performed but the disengaging margin is substantially zero (an engagement standby state) by the hydraulic control. However, this requires extremely accurate hydraulic control. Also, if there are external factors during operation such as centrifugal hydraulic pressure or parts tolerance, calibration for that is also necessary.

Therefore, JP-A-7-113465 proposes using a first return spring and a second return spring. The first return spring contacts the piston at all stroke positions. The second return spring contacts the piston at an engagement standby position where the piston has stroked a predetermined amount in the engagement direction. Thus, the engagement standby state can be created without high-precision hydraulic control, and the time required for engagement can be easily reduced.

SUMMARY

The invention according to JP-A-7-113465 relates to a transmission for a passenger vehicle, and therefore, torque passing through the transmission is small. Therefore, the number of friction plates is small, and the volume of the piston is small. Therefore, the urging force required for the return spring is small. Further, it is easy to secure a space for the return spring around the piston and the friction plates.

On the other hand, in a work vehicle, the torque passing through the friction engagement device is large. Therefore, the number of friction plates is large and the piston volume is large. Therefore, the urging force required for the return spring is large. In order to increase the urging force of the return spring, a large return spring is required. However, it is difficult to secure a space for a large return spring around the piston and the friction plates.

An object of the present invention is to easily reduce a time required for engagement in a friction engagement device for a work vehicle while obtaining large urging force suitable for the work vehicle by a return spring.
Solution to Problems A friction engagement device for a work vehicle according to a first aspect comprises a rotating shaft, a plurality of first friction plates, a plurality of second friction plates, a piston, a first return spring, and a second return spring. The first friction plates rotate with the rotating shaft. The second friction plates are arranged to face the first friction plates. Hydraulic fluid is supplied to an oil chamber. The piston is movably provided between an engagement position and a release position. The piston engages the first friction plates and the second friction plates at the engagement position. The piston releases the first friction plates and the second friction plates in the release position. The piston is pressed toward the engagement position by the hydraulic pressure of the oil chamber. The first return spring contacts the piston from the engagement position to a standby position and urges the piston toward the release position. The standby position is a position between the release position and the engagement position. The second return spring contacts the piston from the engagement position to the release position and urges the piston toward the release position. A center axis of the first return spring is arranged to coincide with a center axis of the rotating shaft. A center axis of the second return spring is arranged to coincide with the center axis of the rotating shaft.

In the friction engagement device according to the present aspect, the first return spring and the second return spring can create an engagement standby state with a small disengaging margin. Thereby: the time required for the engagement can be easily reduced. Further the center axis of the first return spring and the center axis of the second return spring are arranged to coincide with the center axis of the rotating shaft. Therefore, it is possible to secure a space in which the large first return spring and the second return spring can be arranged. Therefore, a large urging force can be obtained by using the large first return spring and the large second return spring.

The first return spring and the second return spring may have an inner diameter larger than an outer diameter of the rotating shaft. In this case, a large urging force can be obtained by the large first return spring and the large second return spring.

The second return spring may be arranged radially outward of the first return spring. In this case, it is possible to secure a space in which the large second return spring can be arranged.

The first return spring may be arranged radially inside of the second friction plates. The second return spring may be arranged radially outward of the second friction plates. In this case, it is possible to secure a space n which the large first return spring and the large second return spring can be arranged.

The first return spring may be arranged radially inside of the second friction plates. The second return spring may be arranged radially inside of the second friction plates. In this case, it is possible to secure a space in which the large first return spring and the large second return spring can be arranged.

The first return spring may be a coil spring. In this case, a large urging force can be obtained by the coil spring arranged concentrically with the rotating shaft.

The second return spring may be a wave spring. In this case, a large urging force can be obtained by the wave spring arranged concentrically with the rotating shaft. Further, gaps between the first friction plates and the second friction plates can be secured uniformly by the wave spring. Therefore, the cooling efficiency of the friction plates can be improved.

The second return spring may be a coil spring. In this case, a large urging force can be obtained by the coil spring arranged concentrically with the rotating shaft.

The friction engagement device may further include a spacer and a restriction member. The spacer may be arranged between the piston and the first return spring. The restricting member may restrict a movement of the spacer toward the release position. With the piston at the release position, the spacer may be separated from the piston. In this case, the standby position can be easily adjusted by setting a distance between the piston and the spacer when the piston is located at the release position depending on the shape of the spacer. Thus, the timing at which the friction plates enters the engagement standby state can be easily adjusted.

A work vehicle according to a second aspect comprises an engine, a hydraulic pump, a work implement, and the friction engagement device described above. The hydraulic pump is driven by the engine. The work implement is driven by hydraulic fluid discharged from a hydraulic pump.

According to the present invention, a time required for engagement in a friction engagement device for a work vehicle can be easily reduced while obtaining large urging force suitable for the work vehicle by a return spring.

DETAILED DESCRIPTION OF EMBODIMENT(S)

Figure 1:
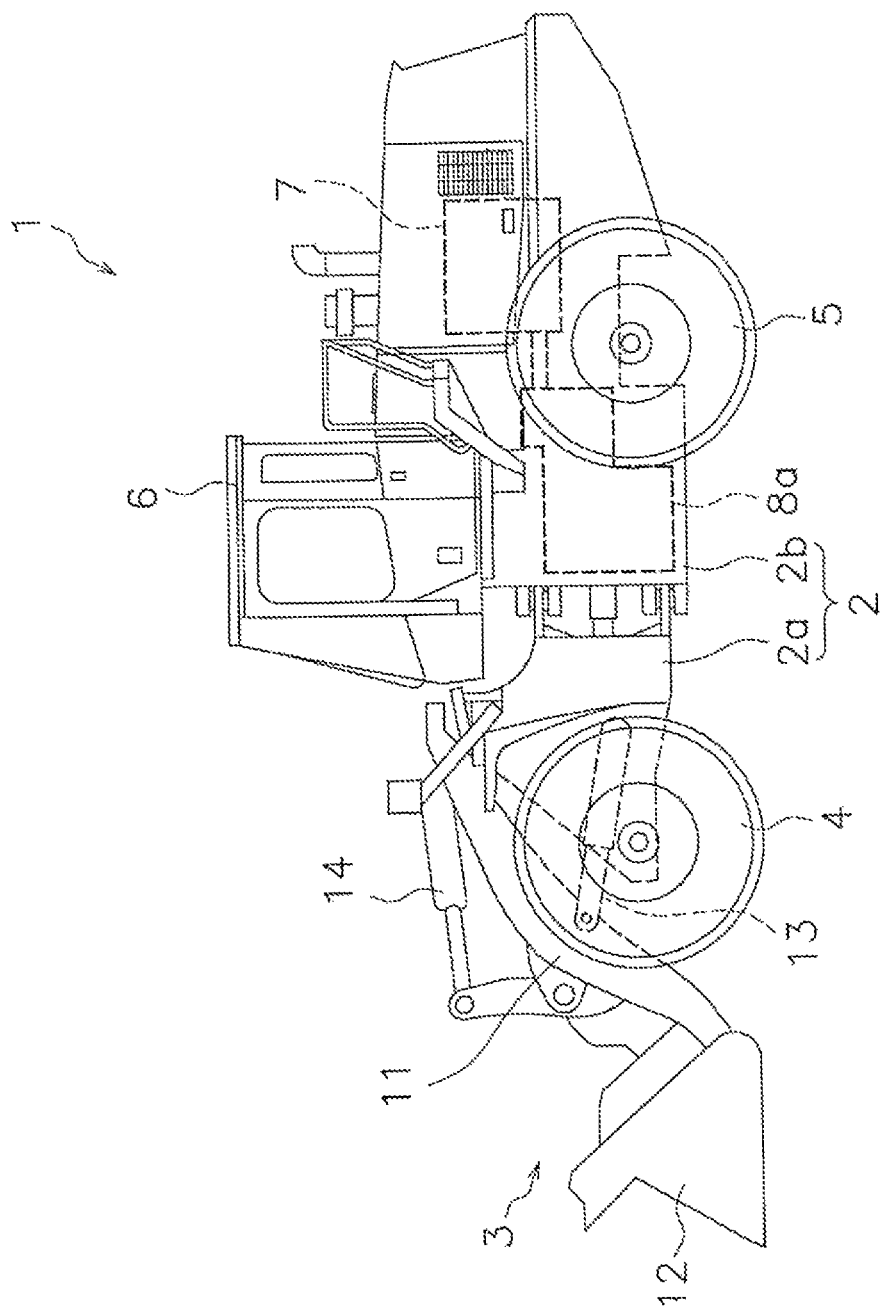
FIG. 1 is a side view of a work vehicle according to an embodiment.
Figure 2:
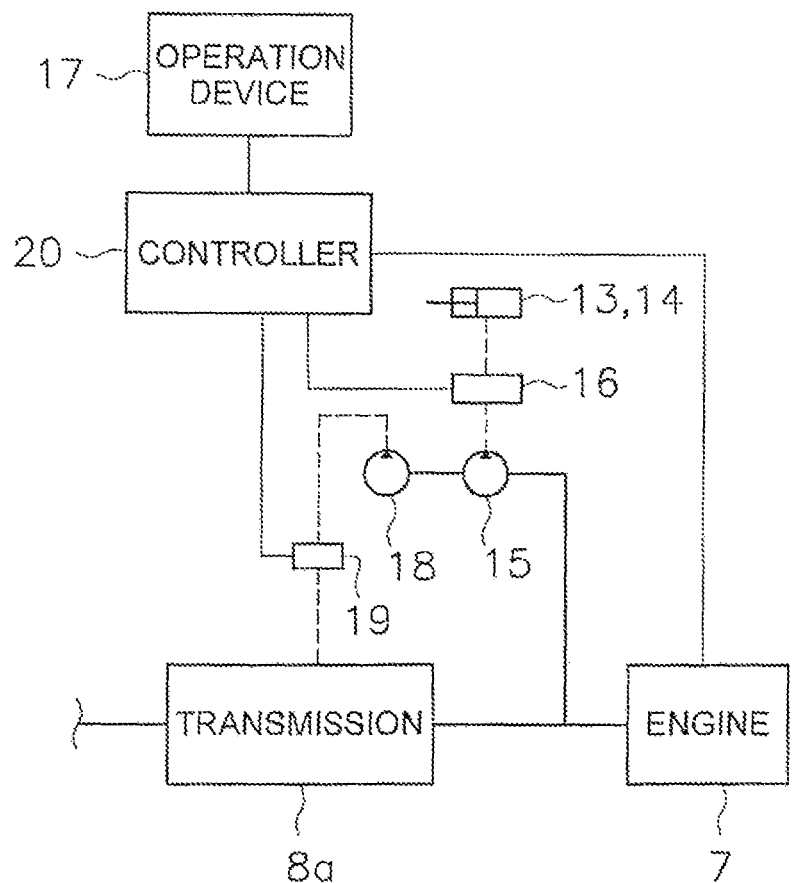
FIG. 2 is a block diagram showing a configuration of the work vehicle.

Hereinafter, embodiments of the present invention will be described with reference to the drawings. FIG. 1 is a side view of a work vehicle 1 according to an embodiment of the present invention. FIG. 2 is a block diagram showing a configuration of a control system of the work vehicle 1. As illustrated in FIG. 1. the work vehicle 1 includes a body frame 2, a work implement 3, traveling wheels 4 and 5, a cab 6, an engine 7, and a transmission 8a.

The body frame 2 includes a font frame 2a and a rear frame 2b. The front frame 2a is attached to the front of the rear frame 2b. The front frame 2a is rotatably connected to the rear frame 2b. The traveling wheels 4 and 5 include a front wheel 4 and a rear wheel 5. The front wheel 4 is rotatably attached to the front frame 2a. The rear wheel 5 is rotatably attached to the rear frame 2b.

The work vehicle 1 can perform work such as excavation using the work implement 3. The work implement 3 is driven by hydraulic fluid from a hydraulic pump 15 illustrated in FIG. 2. The work implement 3 includes a boom 11 and a bucket 12. The work implement 3 includes hydraulic cylinders 13 and 14. When the hydraulic cylinders 13 and 14 expand and contract by the hydraulic fluid from the hydraulic pump 15, the boom 11 and the bucket 12 operate.

The cab 6 is mounted on the body frame 2. A seat on which an operator sits, an operation device 17 illustrated in FIG. 2, and the like are arranged in the cab 6. The operation device 17 includes, for example, a lever, a pedal, a switch, and the like. The engine 7 and the transmission 8a are mounted on the body frame 2. The engine 7 is, for example, a diesel engine. The transmission 8a transmits a rotational force from the engine 7 to the traveling wheels 4 and 5. As a result, the traveling wheels 4 and 5 are rotationally driven, so that the work vehicle 1 travels.

As illustrated in FIG. 2, the work, vehicle 1 includes a control valve 16. The control valve 16 controls a flow rate of the hydraulic fluid supplied from the hydraulic pump 15 to the hydraulic cylinders 13 and 14.

The work vehicle 1 includes a hydraulic pump 18 and a control valve 19. The hydraulic pump 18 is driven by the engine 7. The hydraulic fluid discharged from the hydraulic pump 18 is supplied to the transmission 8a. The control valve 19 controls a flow rate of the hydraulic fluid supplied from the hydraulic pump 18 to the transmission 8a.

The control system of the work vehicle 1 includes a controller 20. The controller 20 includes a processor such as a CPU and a storage device such as a RAM and a ROM. The controller 20 controls the work implement 3 by controlling the control valve 16 in accordance with the operation of the operation device 17. The controller 20 controls the transmission 8a by controlling the control valve 19.

Figure 3:
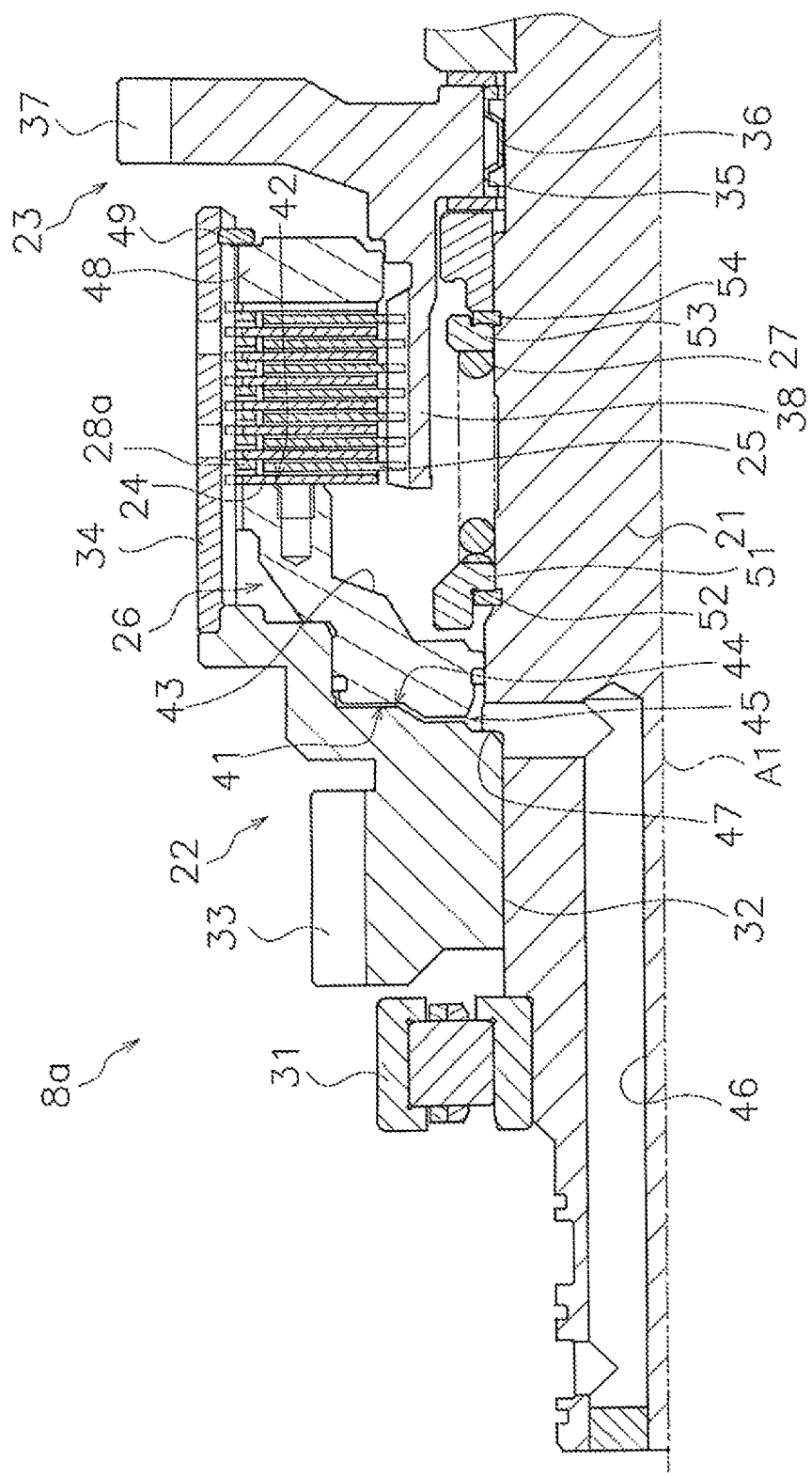
FIG. 3 is a cross-sectional view of a transmission according to a first embodiment.

FIG. 3 is a cross-sectional view showing a part of the transmission 8a according to a first embodiment. The transmission 8a includes a rotating shaft 21, a first rotating element 22, a second rotating element 23, a plurality of first friction plates 24, a plurality of second friction plates 25, a piston 26, a first return spring 27, and a plurality of second return springs 28a. Note that, in the drawings, only a part of the plurality of first friction plates 24, the plurality of second friction plates 25, and the plurality of second return springs 28a are denoted by reference numerals.

The rotating shaft 21 is rotatably supported by a bearing 31. The rotating shaft 21 is rotated by a driving force from the engine. The first rotating element 22 is arranged concentrically with a center axis A1 of the rotating shaft 21. In the following description, a direction parallel to the center axis A1 is referred to as "axial direction (A1)".

The first rotating element 22 includes a through hole 32. The rotating shaft 21 is inserted into the through hole 32. The first rotating element 22 is fixed so as not to rotate with respect to the rotating shaft 21. Therefore, the first rotating element 22 rotates together with the rotating shaft 21.

The first rotating element 22 includes a first gear portion 33 and a first sleeve portion. The first gear portion 33 meshes with another gear (not illustrated) of the transmission 8a. The first sleeve portion 34 is aligned with the first gear portion 33 in the axial direction (A1) of the rotating shaft 21 and is connected to the first gear portion 33. The piston 26, the first friction plates 24, the second friction plates 25, the first return spring 27, and the second return springs 28 are arranged in the first sleeve portion 34.

The second rotating element 23 is arranged concentrically with the rotating shaft 21. The second rotating element 23 includes a through hole 35. The rotating shaft 21 is inserted into the through hole 35. The second rotating element 23 is rotatably supported on the rotating shaft 21 via a bearing 36. Therefore, the second rotating element 23 is rotatable relative to the rotating shaft 21.

The second rotating element 23 includes a second gear portion 37 and a second sleeve portion 38. The second gear portion 37 meshes with another gear (not illustrated) of the transmission 8a. The second sleeve portion 38 is aligned with the second gear portion 37 in the axial direction (A1) of the rotating shaft 21 and is connected to the second gear portion 37. The second sleeve portion 38 is arranged inside the first sleeve portion 34.

The first friction plates 24 and the second friction plates 25 are clutch disks. The first friction plates 24 and the second friction plates 25 are arranged concentrically with the rotating shaft 21. The first friction plates 24 and the second friction plates 25 are alternately arranged in the axial direction (A1). The first friction plates 24 and the second friction plates 25 are arranged radially inside of the first sleeve portion 34. The first friction plates 24 and the second friction plates 25 are arranged radially outward of the second sleeve portion 38. That is, the first friction plates 24 and the second friction plates 25 are arranged between the first sleeve portion 34 and the second sleeve portion 38 in the radial direction.

The first friction plates 24 are axially movable with respect to the first rotating element 22 and are non-rotatably supported around the center axis A1. Therefore, the first friction plates 24 rotate together with the rotating shaft 21. The second friction plates 25 are arranged to face the first friction plates 24 in the axial direction (A1). The outer diameter of the second friction plates 25 is smaller than the outer diameter of the first friction plates 24. The second friction plates 25 are axially movable with respect to the second rotating element 23, and are non-rotatably supported around the center axis A1 Therefore, the second friction plates 25 rotate together with the second rotating element 23.

The piston 26 is provided movably in the axial direction (A1) inside the first sleeve portion 34. The piston 26 is movable between an engagement position and a release position. The piston 26 engages the first friction plates 24 and the second friction plates 25 at the engagement position. The piston 26 releases the first friction plates 24 and the second friction plates 25 at the release position.

The piston 26 includes a pressure receiving portion 41, a pressing portion 42, and a recess 43. The pressure receiving portion 41 is one side surface of the piston 26 in the axial direction (A1), and the pressing portion 42 is the other side surface of the piston 26 in the axial direction (A1). The pressure receiving portion 41 is arranged to face the inner side surface 44 of the first sleeve portion 34 in the axial direction (A1). An oil chamber 45 is provided between the pressure receiving portion 41 and the inner side surface 44 of the first sleeve portion 34. An oil passage 46 is provided in the rotating shaft 21. An outlet 47 of the oil passage 46 is arranged facing the oil chamber 45. The hydraulic fluid is supplied to the oil chamber 45 through the oil passage 45.

The pressing portion 42 faces the first friction plates 24 in the axial direction (A1). The hydraulic pressure in the oil chamber 45 presses the piston 26 toward the engagement position (to the right in FIG. 3). Thereby, the pressing portion 42 presses the first friction plates 24 against the second friction plates 25. In addition, a spacer 48 and a restriction member 49 are arranged on the opposite side of the piston 26 with respect to the first friction plates 24 and the second friction plates 25. The restriction member 49 is a snap ring, and is fixed to the first sleeve portion 34. The spacer 48 and the restriction member 49 restricts the movement of the first friction plates 24 and the second friction plates 25 in the direction toward the engagement position.

The recess 43 has a shape recessed in the axial direction (A1) from the pressing portion 42. At least a part of the first return spring 27 is arranged in the recess 43.

The first return spring 27 contacts the piston 26 from the engagement position to the standby position and urges the piston 26 toward the release position. The standby position is a position between the release position and the engagement position. The first return spring 27 is a coil spring. The rotating shaft 21 is arranged to pass through the inside of the first return spring 27. The first return spring 27 is arranged concentrically with the rotating shaft 21. That is, the center axis of the first return spring 27 is arranged so as to coincide with the center axis A1 of the rotating shaft 21. The first return spring 27 has the inner diameter larger than the outer diameter of the rotating shaft 21. The first return spring 27 is arranged radially inside of the first friction plates 24 and the second friction plates 25. At least a part of the first return spring 27 is arranged inside the second sleeve portion 38.

The transmission 8a includes a first spacer 51, a first restriction member 52, a second spacer 53, and a second restriction member 54. The first spacer 51 is arranged between the piston 26 and the first return spring 27 in the axial direction (A1). The first restriction member 52 is a snap ring, and is fixed to the rotating shaft 21. The first restriction member 52 restricts the movement of the first spacer 51 toward the release position. When the piston 26 is located at the release position, the first spacer 51 is separated from the piston 26 by a predetermined distance.

The second spacer 53 is arranged on the opposite side of the first spacer 51 with respect to the first return spring 27 in the axial direction (A1). The second restriction member 54 is a snap ring, and is fixed to the rotating shaft 21. The second restriction member 54 restricts the movement of the second spacer 53 toward the engagement position. The first return spring 27 is held between the first spacer 51 and the second spacer 53 in a compressed state.

The second return springs 28a contact the piston 26 from the engagement position to the release position and urge the piston 26 toward the release position. The second return springs 28a are a plurality of wave springs. The plurality of wave springs are alternately arranged with the plurality of first friction plates in the axial direction (A1). The rotating shaft 21 is arranged so as to pass through the inside of the second return springs 28a. The second return springs 28a are arranged concentrically with the rotating shaft 21. That is, the center axis of the second return springs 28a is arranged so as to coincide with the center axis A1 of the rotating shaft 21.

The second return springs 28a have the inner diameter larger than the outer diameter of the rotating shaft 21. The second return springs 28a are arranged radially outward of the first return spring 27. The second return springs 28a have an inner diameter larger than the outer diameter of the first return spring 27. The second return springs 28a are arranged radially outward of the second sleeve portion 38. The second return springs 28a are arranged radially outward of the second friction plates 25.

Figure 4:
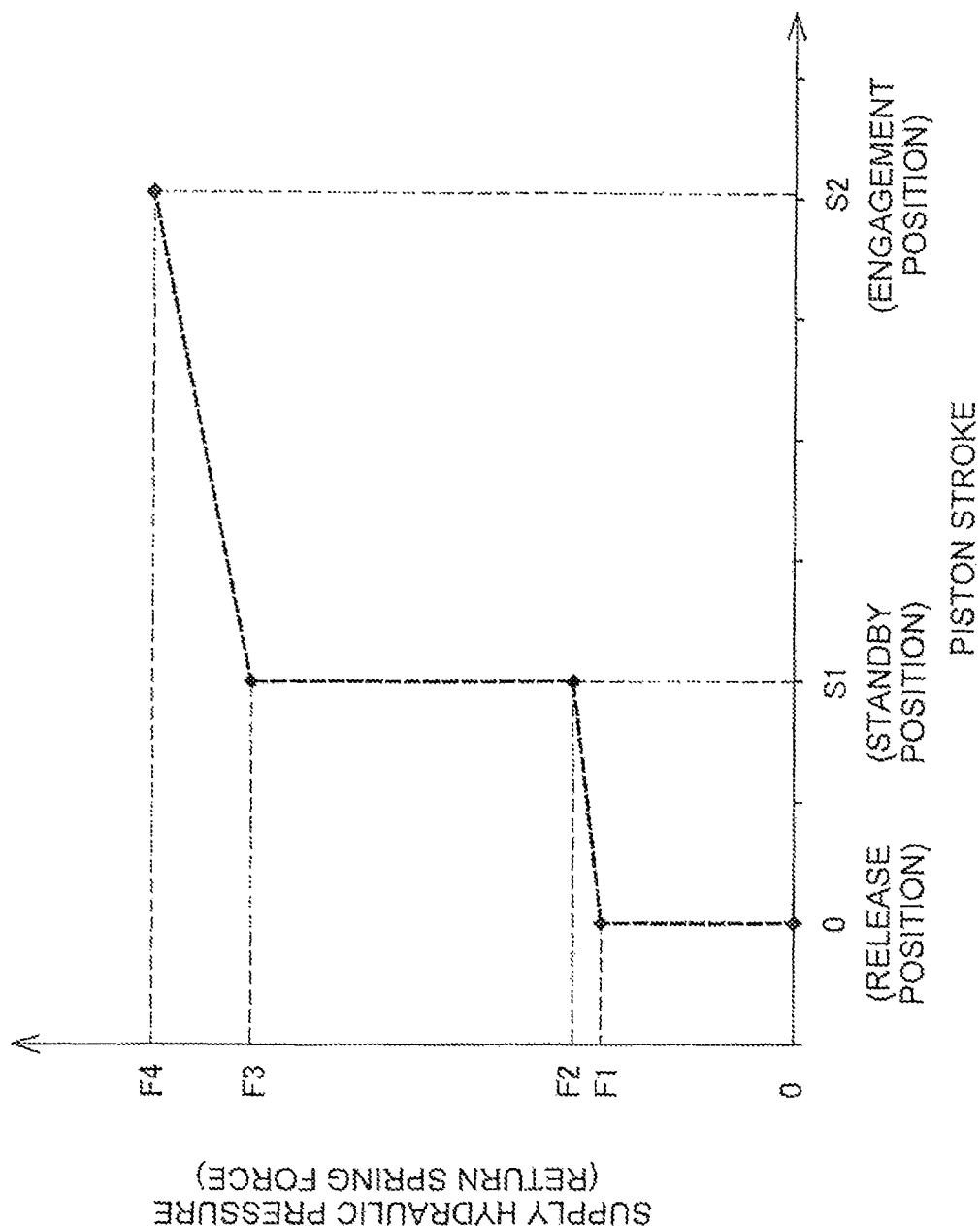
FIG. 4 is a diagram showing 3 relationship between supply hydraulic pressure and a stroke of a piston.

FIG. 4 is a diagram showing the relationship between the stroke of the piston 26 and the supply hydraulic pressure.

The supply hydraulic pressure is the hydraulic pressure of the oil chamber 45 that presses the piston 26 toward the engagement position. The supply hydraulic pressure corresponds to the magnitude of the urging force (return spring force) on the piston 26 toward the release position by the first return spring 27 and the second return springs 28a.

When the supply hydraulic pressure is 0, the piston 26 is located at the release position of the stroke 0. In this state, the piston 26 is separated from the first spacer 51 as illustrated in FIG. 4. In a range where the supply hydraulic pressure is equal to or greater than 0 and less than a first pressure value F1, the pressing force applied to the piston 26 by the supply hydraulic pressure is smaller than the urging force of the second return springs 28a. Therefore, in this range, the piston 26 is maintained at the release position by the urging force of the second return springs 28a. In this state, the first friction plates 24 and the second friction plates 25 are released, and the rotation of the first rotating element 22 is not transmitted to the second rotating element 23.

When the supply hydraulic pressure increases and becomes equal to or greater than the first pressure value F1, the pressing force applied to the piston 26 by the supply hydraulic pressure becomes larger than the urging force of the second return springs 28a. Therefore, the piston 26 moves toward the engagement position against the urging force of the second return springs 28a. However, the first spacer 51 is separated from the piston 26 until the stroke of the piston 26 reaches a first stroke value S1. Therefore, the urging force of the second return springs 28a acts on the piston 26, but the urging force of the first return spring 27 does not act.

When the supply hydraulic pressure reaches a second pressure value F2 (>F1), the stroke of the piston 26 becomes the first stroke value S1. In this state, the piston 26 is located at the standby position. When the piston 26 is located at the standby position, the piston 26 contacts the first spacer 51. In a range where the supply hydraulic pressure is equal to or more than the second pressure value F2 and less than a third pressure value F3, the pressing force applied to the piston 26 by the supply hydraulic pressure is smaller than the urging force of the first return spring 27 and the second return springs 28a. Therefore, in this range, the piston 26 is maintained at the standby position by the urging force of the first return spring 27 and the second return springs 28a. In this state, the distance (disengaging margin) between the first friction plates 24 and the second friction plates 25 is substantially 0, and the first friction plates 24 and the second friction plates 25 are maintained at the standby state.

When the supply hydraulic pressure becomes equal to or higher than the third pressure value F3 (>F2), the pressing force applied to the piston 26 by the supply hydraulic pressure becomes larger than the urging force of the first return spring 27 and the second return springs 28a. Therefore, the piston 26 moves toward the engagement position against the urging force of the first return spring 27 and the second return springs 28a. Thereby, the engagement between the first friction plates 24 and the second friction plates 25 is started. Thereby, transmission of the rotation of the first rotating element 22 to the second rotating element 23 is started. When the supply hydraulic pressure reaches a fourth pressure value F4, the stroke of the piston 26 becomes a second stroke value S2. In this state, the piston 26 is located at the engagement position. In this state, the first friction plates 24 and the second friction plates 25 are completely engaged.

In the transmission 8a according to the present embodiment described above, the first return spring 27 and the second return springs 28a can create the engagement standby state with the small disengaging margin. Thereby, the time required for the engagement can be easily reduced. The center axis of the first return spring 27 and the center axis of the second return springs 26a are arranged to coincide with the center axis A1 of the rotating shaft 21. Therefore, it is possible to secure a space in which the large first return spring 27 and the large second return springs 28a can be arranged. Thus, a large urging force suitable for the work vehicle 1 can be obtained by using the large first return spring 27 and the large second return springs 28a.

The first return spring 27 and the second return springs 28a have the inner diameter larger than the outer diameter of the rotating shaft 21. Therefore, a large urging force can be obtained by the large first return spring 27 and the large second return springs 28a.

The first return spring 27 is arranged radially inside of the first friction plates 24. The second return springs 28a are arranged radially outward of the first return spring 27. Therefore, it is possible to secure a space in which the large first return spring 27 and the large second return springs 28a can be arranged.

The second return springs 283 are wave springs. Therefore, the gaps between the first friction plates 24 and the second friction plates 25 can be secured evenly. Thereby, the cooling efficiency of the friction plates can be improved.

When the piston 26 is located at the release position, the first spacer 51 is separated from the piston 26. Therefore, the standby position can be easily adjusted by setting the distance between the first spacer 51 and the piston 26 at the release position depending on the shape of the first spacer 51. Thereby, the timing at which the friction plates 24 and 25 enter the engagement standby state can be easily adjusted.

Figure 5:
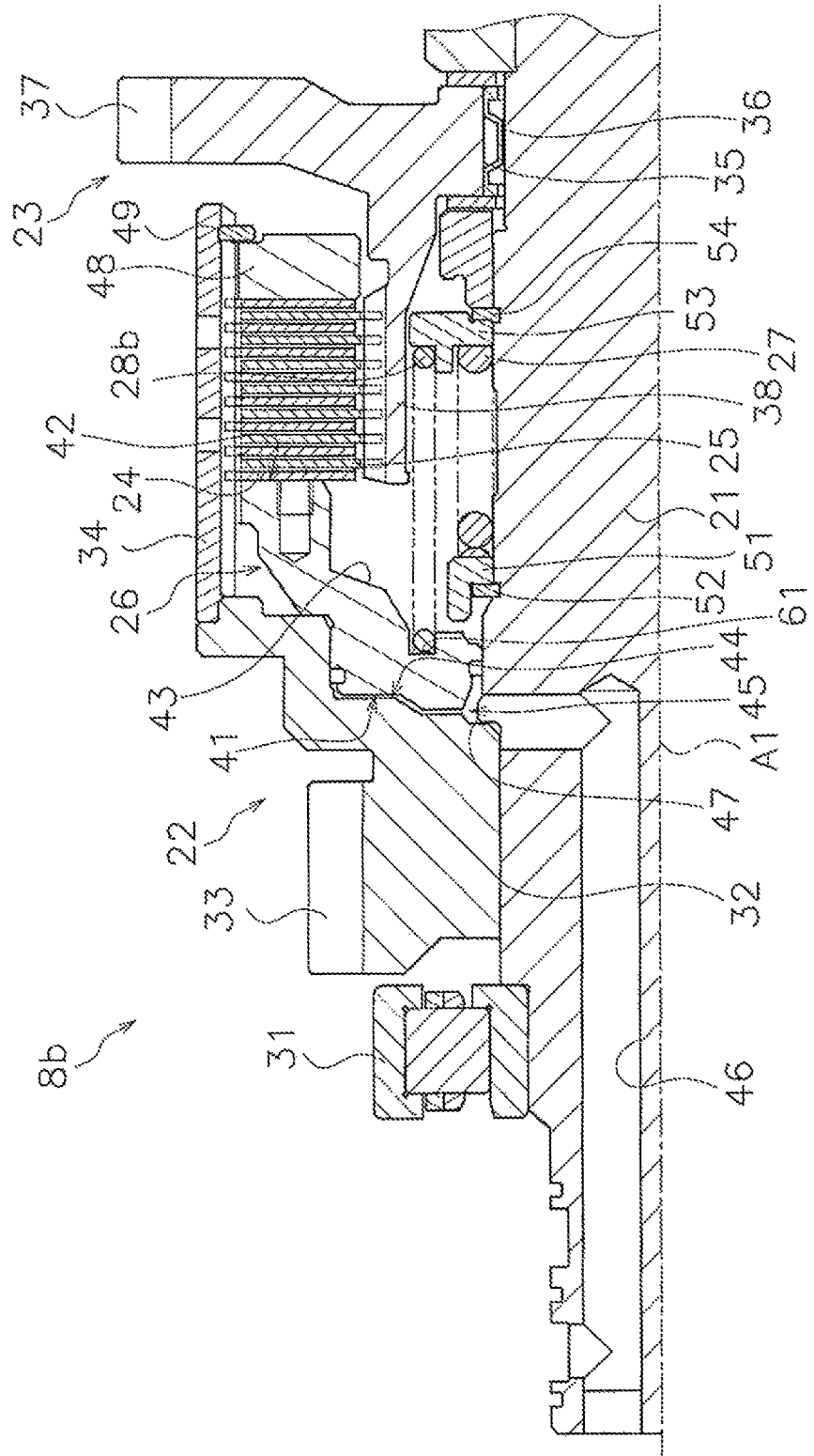
FIG. 5 is a cross-sectional view of a transmission according to a second embodiment.

Next, a second embodiment will be described. FIG. 5 is a cross-sectional view showing a part of a transmission 8b according to the second embodiment. The transmission 8b according to the second embodiment includes a second return spring 28b instead of the second return springs 28a of the first embodiment. The second return spring 28b is a coil spring. The rotating shaft 21 is arranged so as to pass through the inside of the second return spring 28b. The second return spring 28b is arranged concentrically with the rotating shaft 21. That is, the center axis of the second return spring 28b is arranged to coincide with the center axis of the rotating shaft 21. The second return spring 28b has an inner diameter larger than the outer diameter of the rotating shaft 21.

The second return spring 28b is arranged radially inside of the first friction plates 24 and the second friction plates 25. The second return spring 28b has an inner diameter larger than the outer diameter of the first return spring 27. The second return spring 28b is arranged radially outward of the first return spring 27. Therefore, the second return spring 28b is arranged between the first friction plates 24 and the second friction plates 25 and the first return spring 27 in the radial direction. At least a part of the second return spring 28b is arranged inside the second sleeve portion 38. At least a part of the second return spring 28b is arranged between the second sleeve portion 38 and the first return spring 27 in the radial direction.

The piston 26 includes a spring support 61. The spring support 61 is provided on the inner surface of the recess 43 of the piston 26. The second return spring 28b is supported by the spring support 61. The second return spring 28b is arranged between the second spacer 53 and the piston 26.

The second return spring 28b is longer than the first return spring 27 in the axial direction (A1).

Other configurations of the transmission 8b according to the second embodiment are the same as those of the transmission 8a according to the first embodiment. In the transmission 8b according to the second embodiment, the same effects as those of the transmission 8a according to the above-described first embodiment can be obtained.

Preferred embodiments of the present invention have been explained above. However, the present invention is not limited to the aforementioned embodiments, and a variety of changes can be made without departing from the gist of the present invention.

The work vehicle 1 is not limited to a wheel loader, and may be another type of work vehicle such as a motor grader, a hydraulic shovel, or a bulldozer. In the above embodiment, a transmission is mentioned as an example of the friction engagement device. However, the friction engagement device may be another device such as a brake device.

The shapes and arrangements of the rotating shaft 21, the first rotating element 22, the second rotating element 23, the plurality of first friction plates 24, the plurality of second friction plates 25, the piston 26, the first return spring, and the second return springs 28a and 28b are not limited to those of the above-described embodiments, and may be changed. The shapes and arrangements of the spacers 48, 51, 53 and the restriction members 49,52, 54 are not limited to those of the above-described embodiments, and may be changed. For example, the restriction member is not limited to the snap ring, and may be another member. For example, the restriction member may be a step provided on the rotating shaft 21 or the first rotating element 22.

According to the present invention, a time required for engagement in a friction engagement device for a work vehicle can be easily reduced while obtaining large urging force suitable for the work vehicle by a return spring.

The invention claimed is:

1. A friction engagement device for a work vehicle, the friction engagement device comprising:
   a rotating shaft;
   a plurality of first friction plates that rotate with the rotating shaft;
   a plurality of second friction plates arranged to face the first friction plates;
   an oil chamber to which hydraulic fluid is supplied;
   a piston movably provided between an engagement position and a release position, the piston engaging the first friction plates and the second friction plates at the engagement position, the piston releasing the first friction plates and the second friction plates at the release position, and the piston being pressed toward the engagement position by hydraulic pressure of the oil chamber;
   a first return spring arranged to bias the piston toward the release position from the engagement position to a standby position located between the release position and the engagement position; and
   a second return spring arranged to bias the piston toward the release position from the engagement position to the release position,
   a center axis of the first return spring being arranged to coincide with a center axis of the rotating shaft, and
   a center axis of the second return spring being arranged to coincide with the center axis of the rotating shaft.

2. The friction engagement device according to claim 1, wherein
   the first return spring and the second return spring have inner diameters larger than an outer diameter of the rotating shaft.

3. The friction engagement device according to claim 1, wherein
   the second return spring is arranged radially outward of the first return spring.

4. The friction engagement device according to claim 1, wherein
   the first return spring is arranged radially inside of the second friction plates, and
   the second return spring is arranged radially outward of the second friction plates.

5. The friction engagement device according to claim 1, wherein
   the first return spring is arranged radially inside of the second friction plates, and
   the second return spring is arranged radially inside of the second friction plates.

6. The friction engagement device according to claim 1, wherein
   the first return spring is a coil spring.

7. The friction engagement device according to claim 1, wherein
   the second return spring is a wave spring.

8. The friction engagement device according to claim 1, wherein
   the second return spring is a coil spring.

9. The friction engagement device according to claim 1, further comprising:
   a spacer arranged between the piston and the first return spring; and
   a restriction member restricting a movement of the spacer toward the release position;
   the spacer being separated from the piston when the piston is located at the release position.

10. A work vehicle including the friction engagement device according to claim 1, the work vehicle further comprising:
    an engine;
    a hydraulic pump driven by the engine; and
    a work implement driven by hydraulic fluid discharged from the hydraulic pump.

\* \* \* \* \*